(12) United States Patent
Perritt (10) Patent No.: US 8,690,601 B2
(45) Date of Patent: Apr. 8, 2014

(54) QUICK PLUG

(76) Inventor: Mark Perritt, Fort Smith, AR (US)

( * ) Notice: Subject to any disclaimer, the term of this patent is extended or adjusted under 35 U.S.C. 154(b) by 1 day.

(21) Appl. No.: 13/268,184

(22) Filed: Oct. 7, 2011

(65) Prior Publication Data

US 2012/0088399 A1 Apr. 12, 2012

Related U.S. Application Data

(60) Provisional application No. 61/404,719, filed on Oct. 8, 2010.

(51) Int. Cl.
*H01R 13/60* (2006.01)
(52) U.S. Cl.
USPC .......................................................... 439/535
(58) Field of Classification Search
USPC ......... 439/655, 640, 628, 533, 535, 404, 172, 439/131, 373; 174/67
See application file for complete search history.

(56) References Cited

U.S. PATENT DOCUMENTS

| | | | |
|---|---|---|---|
| 6,984,153 B2 * | 1/2006 | Lai et al. | 439/640 |
| 7,799,992 B2 * | 9/2010 | Pinkowski | 174/66 |
| 2008/0293293 A1 * | 11/2008 | Drane et al. | 439/536 |

* cited by examiner

*Primary Examiner* — Neil Abrams
*Assistant Examiner* — Phuongchi T Nguyen
(74) *Attorney, Agent, or Firm* — Buchingham, Doolittle & Burroughts, LLC (57) ABSTRACT

An architecture is presented that provides a detachable outlet system for switching and changing outlets and switches with ease. The detachable outlet system comprises a receptacle, wherein a male adapter is secured to the receptacle. The detachable outlet system also comprises a gang box wired to comprise a female adapter, wherein the female adapter is positioned internal to the gang box. The gang box can further include a protective plate secured to the front of the gang box, and a spacer plate secured to the protective plate. The male adapter is then aligned with the female adapter of the gang box, and a user exhibits a pushing force to insert the receptacle into the gang box. Once the female and male adapters are matingly secured together in electrical communication, a faceplate can be positioned over the receptacle and secured into place.

15 Claims, 8 Drawing Sheets

QUICK PLUG

CROSS-REFERENCE

This application claims priority from Provisional Patent Application Ser. No. 61/404,719 filed Oct. 8, 2010.

BACKGROUND

Changing and switching electrical receptacles and switches can be a tedious and sometimes dangerous activity. Re-wiring the electrical receptacle or switch requires a user to tighten stiff, unmanageable wires using their fingers and other tools, such as needle-nose pliers. Typically, a great strain is put on the users as they need to be able to thread wires through openings, while tightening the ends and securing the wires to the receptacle or switch. Often, there is little light available for users to wire the electrical receptacle or switch, as the power should be turned off for safety. This all leads to an increased chance of the user being electrocuted.

Thus, there is a need for an easier and safer way to change and switch electrical receptacles and switches. The present invention discloses a detachable outlet/light switch system for switching and changing outlets and light switches safely and with ease. The detachable outlet system allows a user to just plug in an electrical receptacle or switch directly into the gang box without re-wiring the receptacle or switch, and without the fear of being electrocuted.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a detachable outlet system for switching and changing outlets with ease. The detachable outlet system comprises a receptacle having a front face and a back face, wherein a male adapter is secured to the back face. The detachable outlet system also comprises a gang box wired to comprise a female adapter, wherein the female adapter is positioned internal to the gang box. Additionally, the receptacle is removably secured to the gang box via mating the male adapter with the female adapter in electrical communication.

Furthermore in the preferred embodiment of the present invention, the gang box can further include a protective plate secured to the front of the gang box, and a spacer plate secured to the protective plate, or vice versa. The receptacle is then secured to the spacer plate, and the male adapter of the receptacle is inserted through openings of the spacer plate and through openings of the protective plate, and further aligned with the openings of the female adapter of the gang box. The male adapter is then aligned with the female adapter of the gang box, and a user exhibits a pushing force to insert the receptacle into the gang box. Once the female and male adapters are matingly secured together in electrical communication with one another, a faceplate can be positioned over the receptacle and secured into place.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DESCRIPTION OF PREFERRED EMBODIMENTS

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a detachable outlet system for switching and changing outlets or light switches safely and with ease. The detachable outlet system allows a user to just plug in an electrical receptacle or switch directly into the gang box without re-wiring the receptacle or switch and without fear of being electrocuted. The detachable outlet system preferably comprises a receptacle having a front face and a back face, wherein a male adapter is secured to the back face. The detachable outlet system also comprises a gang box wired to deliver electricity and comprised of a female adapter positioned internal to the gang box. Additionally, the receptacle is removably secured to the gang box via mating in electrical communication the male adapter with the female adapter. Once the female and male adapters are matingly secured together, a faceplate can be positioned over the receptacle and secured into place.

Figure 1A:
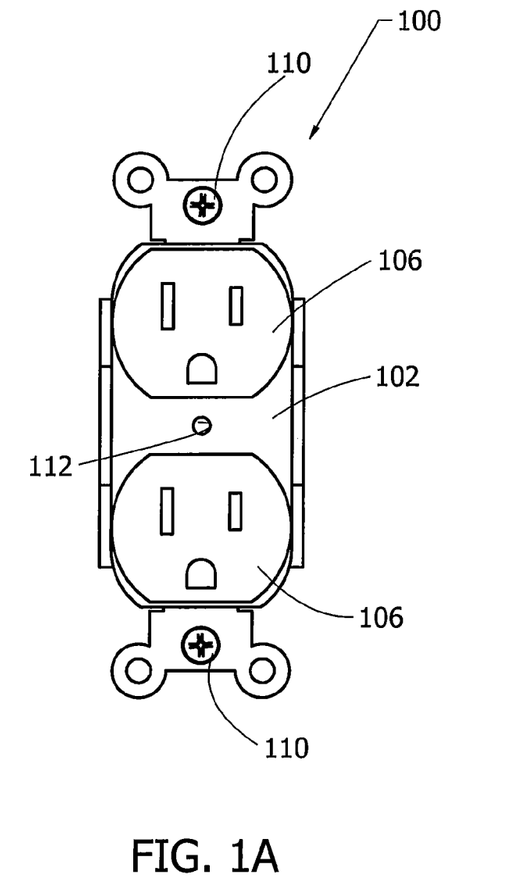
FIGS. 1A and B illustrates a front and side elevational view of a receptacle in accordance with the disclosed architecture.
Figure 1B:
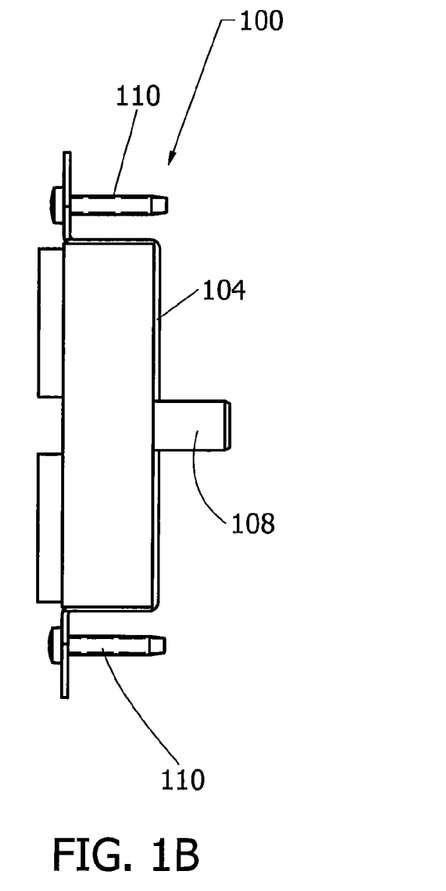

Referring initially to the drawings, FIGS. 1A and B illustrates a receptacle 100 comprising a front face 102 and a back face 104. The front face 102 comprises two electrical outlets 106. The front face 102 can also comprise only one electrical outlet 106, as is common in a 220 Volt application, without affecting the overall concept of the invention. Typically, the receptacle 100 is a 110 Volt receptacle or a 220 Volt receptacle, but the receptacle 100 can even be a 480 Volt receptacle, or any suitable voltage receptacle as is known in the art without affecting the overall concept of the invention. Further, the receptacle 100 can comprise an electrical switch (not shown) instead of an electrical outlet 106. The switch can be a single pole switch or a multiple pole switch, or a three-way switch without affecting the overall concept of the invention. Additionally, the receptacle 100 is generally comprised of injection molded acrylonitrile-butadiene styrene (ABS), though any other suitable material may be used to manufacture the receptacle 100 as is known in the art without affecting the overall concept of the invention. Furthermore, the receptacle 100 comprises a male adapter 108 secured to the back face 104. The male adapter 108 comprises three prongs that protrude from the back face 104 of the receptacle 100 to engage a female adapter (not shown). The third or middle prong is the ground, as is known in the art. The male adapter 108 could only have two prongs, and not have the third prong without affecting the overall concept of the invention, but typically the third prong is included. Screws 110 help to secure the receptacle 100 onto a gang box (not shown). However, screws are not necessary and any other suitable fastening device can be used without affecting the overall concept of the invention. An opening 112 between the outlets 106 allows a faceplate to be secured to the receptacle 100, as is well known in the art. For example, a screw or other fastening device can be threaded through a corresponding hole on the faceplate and then through opening 112 to secure the faceplate to the receptacle 100.

Figure 2:
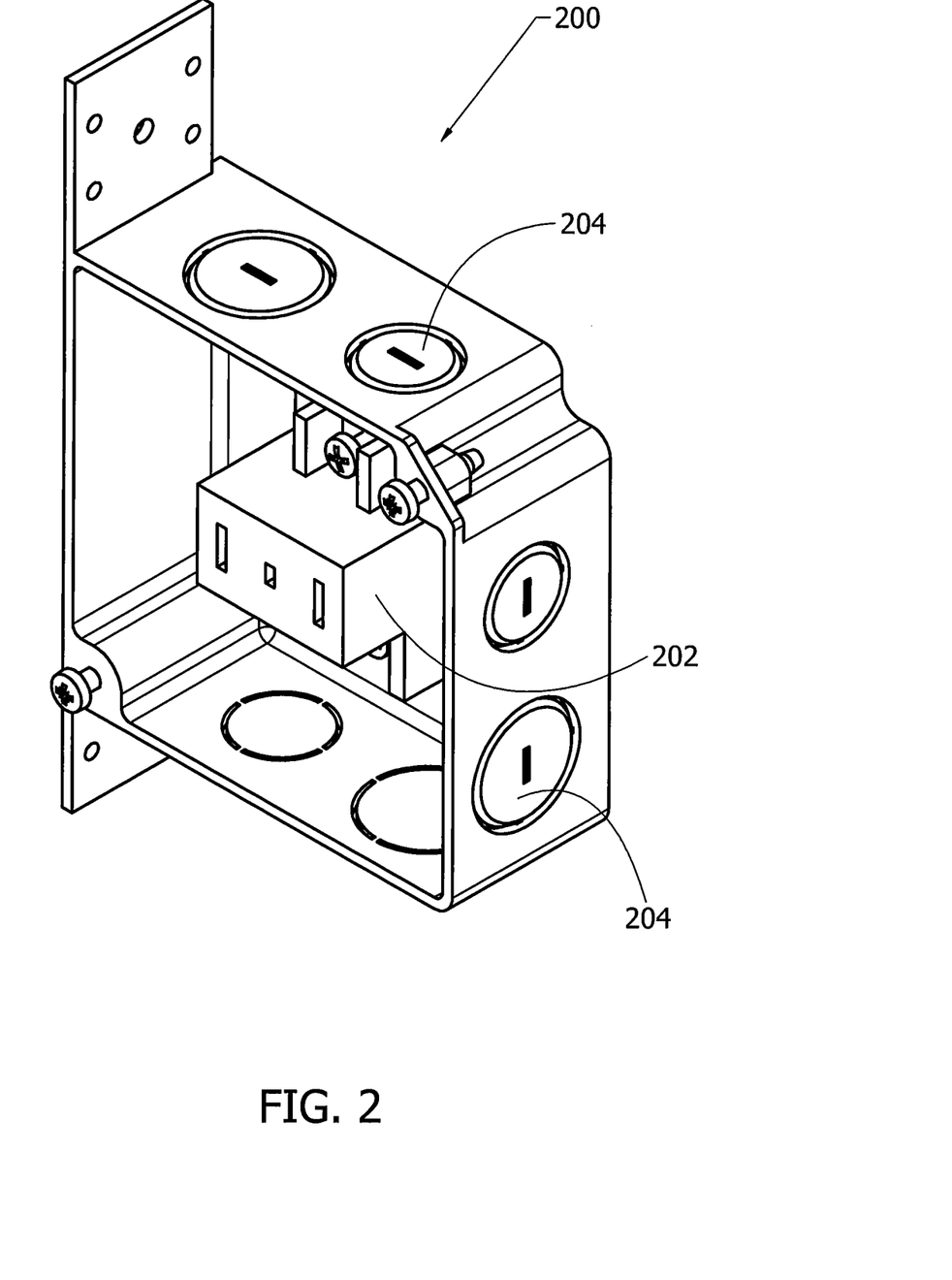
FIG. 2 illustrates a perspective view of the gang box including a female adapter in accordance with the disclosed architecture.

FIG. 2 illustrates a gang box 200 or junction box. The gang box 200 comprises a female adapter 202 and is wired to support and provide electricity to the female adapter 202, as is known in the art. The female adapter can be wired from the sides or the bottom, or any other suitable means. Specifically, electrical wires (not shown) are inserted through openings in the gang box 200 and secured to the female adapter 202. The female adapter 202 is positioned internal to the gang box 200. Typically, the receptacle (not shown) is removably secured to the gang box 200 by mating the male adapter (not shown) with the female adapter 202 in an electrical communication, such that receptacle 100 is capable of providing electricity to a user when male adapter and female adapter 202 are connected. Furthermore, the gang box 200 can be sized to receive two or more receptacles without affecting the overall concept of the invention. Additionally, knock-outs or removable access plugs 204 are provided on the sides of the gang box 200, as is known in the art. Knock-outs 204 are sections that can easily be knocked out to form openings for conduit or cable to enter the gang box 200.

Figure 3:
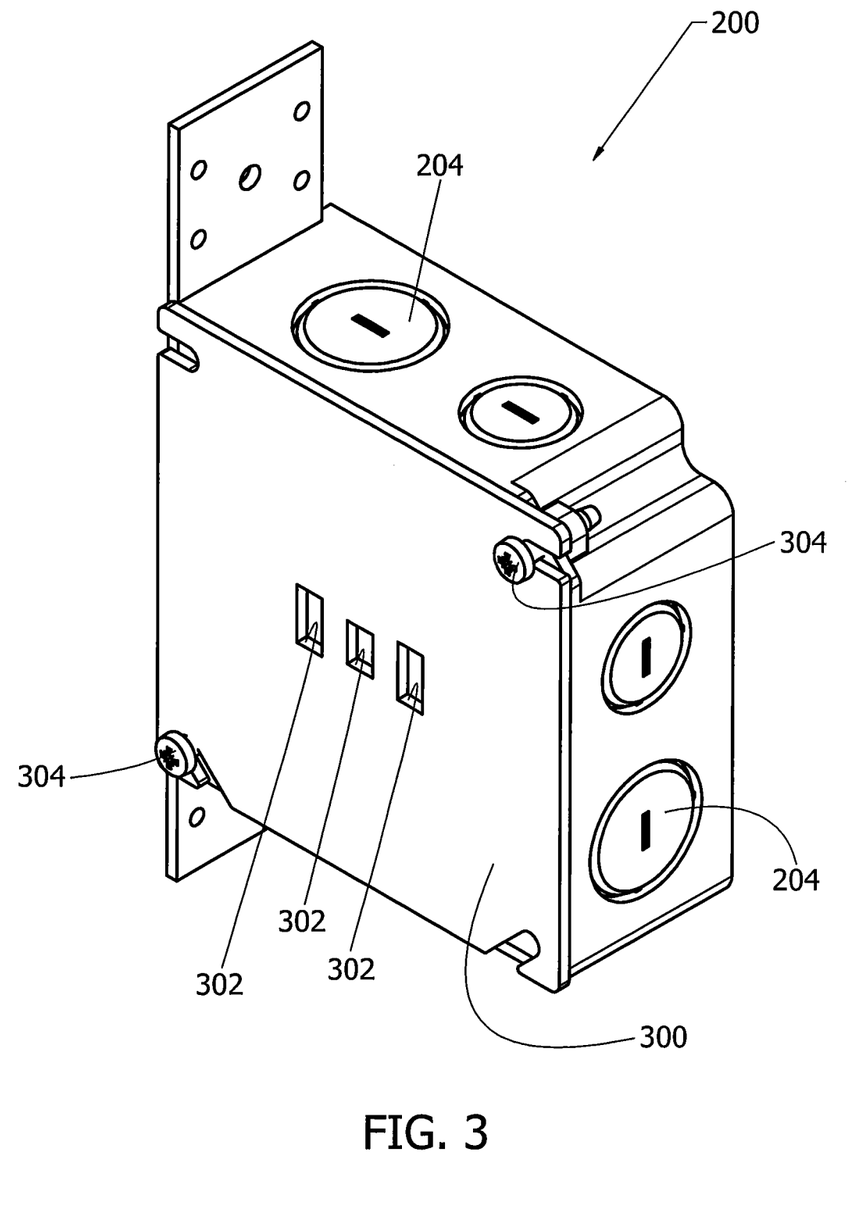
FIG. 3 illustrates a perspective view of the gang box including a protective plate in accordance with the disclosed architecture.

As shown in FIG. 3, a protective plate 300 can be secured to the front of the gang box 200. The protective plate 300 would have openings 302 that correspond with the openings of the female adapter of the gang box 200. The protective plate 300 is used to protect a user from electrifying themselves during switching of the receptacle. It is not a necessary element and the receptacle can be attached to the gang box 200 without the protective plate 300. Furthermore, fastening devices 304, such as screws, secure the protective plate 300 onto the gang box 200. However, screws are not necessary and any other suitable fastening device can be used without affecting the overall concept of the invention. Additionally, knock-outs 204 are provided on the sides of the gang box 200, as is known in the art.

Figure 4:
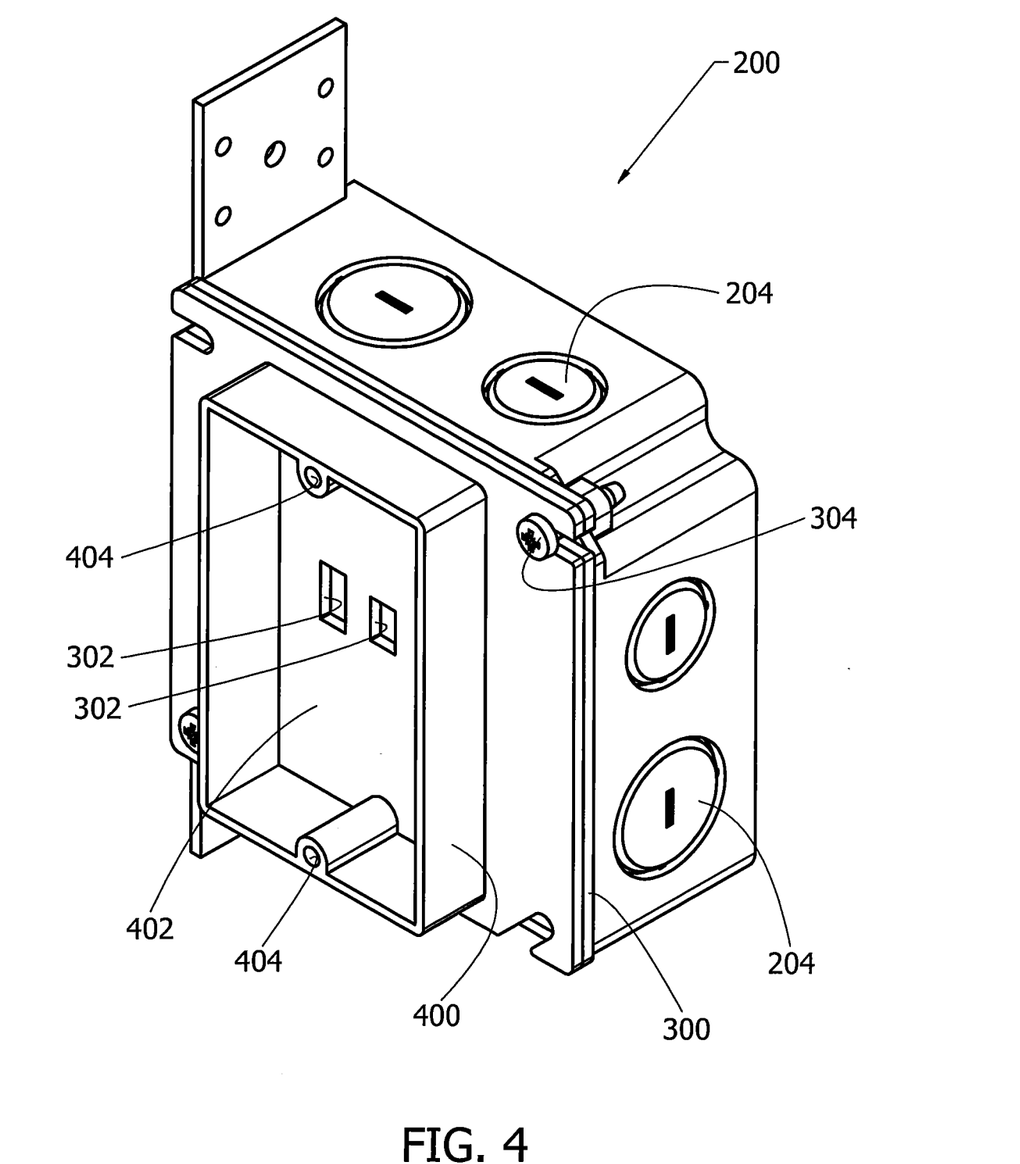
FIG. 4 illustrates a perspective view of the gang box including a spacer plate in accordance with the disclosed architecture.

As shown in FIG. 4, a spacer (attachment) plate 400 can also be secured to the front of the protective plate 300, or directly to the gang box 200. The spacer plate 400 would be secured to the protective plate 300 via fastening devices 304. The spacer plate 400 would have a large central opening 402, wherein the openings 302 of the protective plate 300 can be accessed. The spacer plate 400 is used to position and attach the receptacle (not shown) to the protective plate 300 of the gang box 200. Fastening devices 404, such as screws, or other suitable fastening devices secure the receptacle to the spacer plate 400. The space plate 400 is not a necessary element and the receptacle can be attached to the gang box 200 without the spacer plate 400. Furthermore, the protective plate and spacer plate are shown as separate, distinct components secured together and then secured to the gang box. However, the protective plate and spacer plate can also be manufactured as a single component which would then be secured to the gang box. Additionally, knock-outs 204 are provided on the sides of the gang box 200, as is known in the art.

Figure 5:
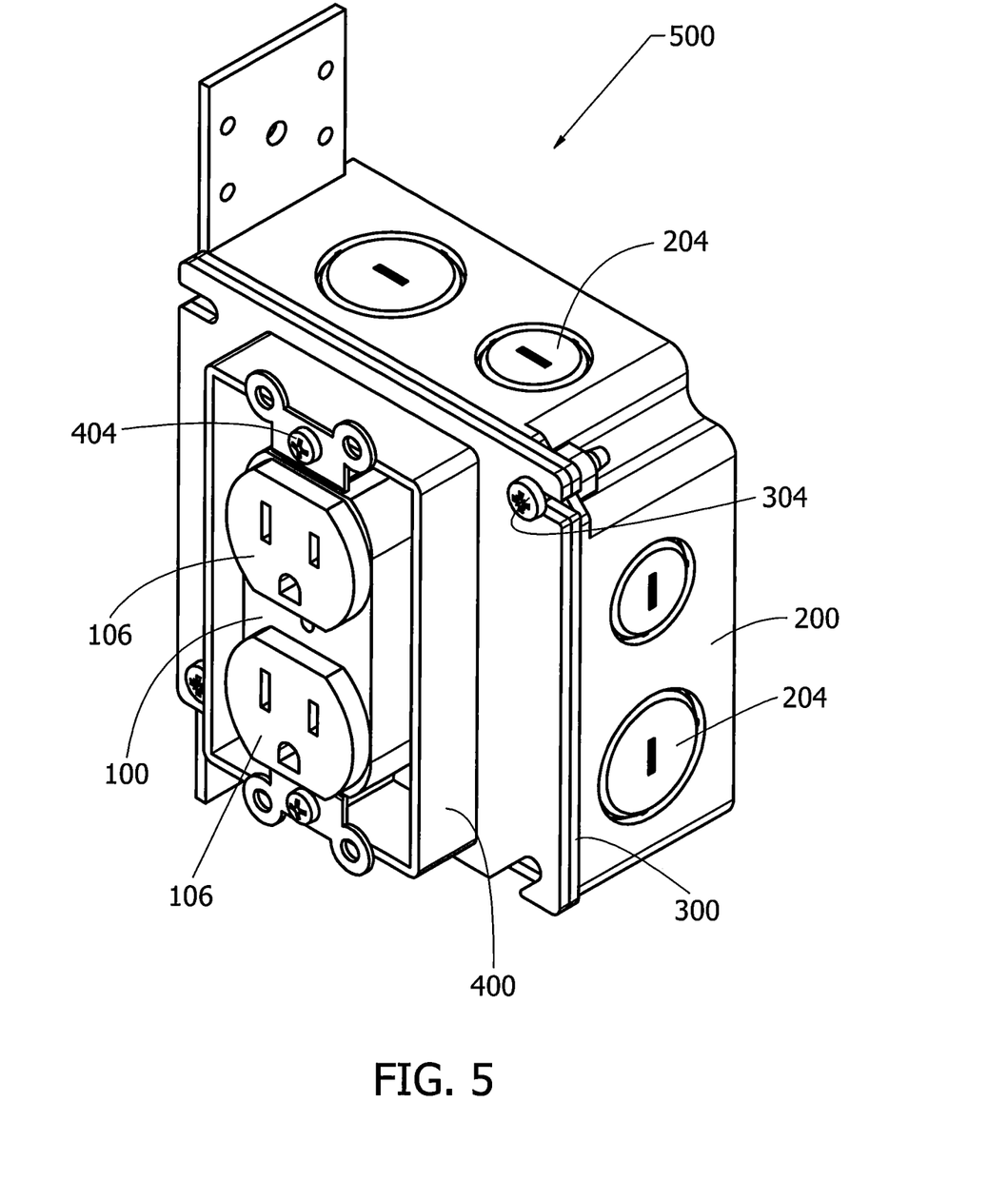
FIG. 5 illustrates a perspective view of the detachable outlet system including an electrical outlet in accordance with the disclosed architecture.

FIG. 5 illustrates the detachable outlet system 500. The detachable outlet system 500 comprises a receptacle 100 removably secured to a gang box 200. The receptacle 100 comprises two electrical outlets 106 and a male adapter (not shown) that protrudes from the back face of the receptacle 100. The gang box 200 comprises a female adapter (not shown) that is electrically wired and positioned internal to the gang box 200. The receptacle 100 is removably secured to the gang box 200 by mating the male adapter with the female adapter in electrical communication. Thus, allowing the receptacle 100 to be easily inserted into and removed from the gang box 200.

Furthermore, the detachable outlet system 500 can also include a protective plate 300 and a spacer plate 400. The protective plate 300 is secured to the gang box 200 via fastening devices 304, then a spacer plate 400 is secured to the protective plate 300 via fastening devices 304, or the protective plate 300 and spacer plate 400 are an integral single component which can then be secured to the gang box 200 via fastening devices 304. Receptacle 100 is then secured to the spacer plate 400 by fastening devices 404. Finally, a faceplate (not shown) can be placed over the receptacle 100 and secured. Additionally, knock-outs 204 are provided on the sides of the gang box 200, as is known in the art.

Figure 6:
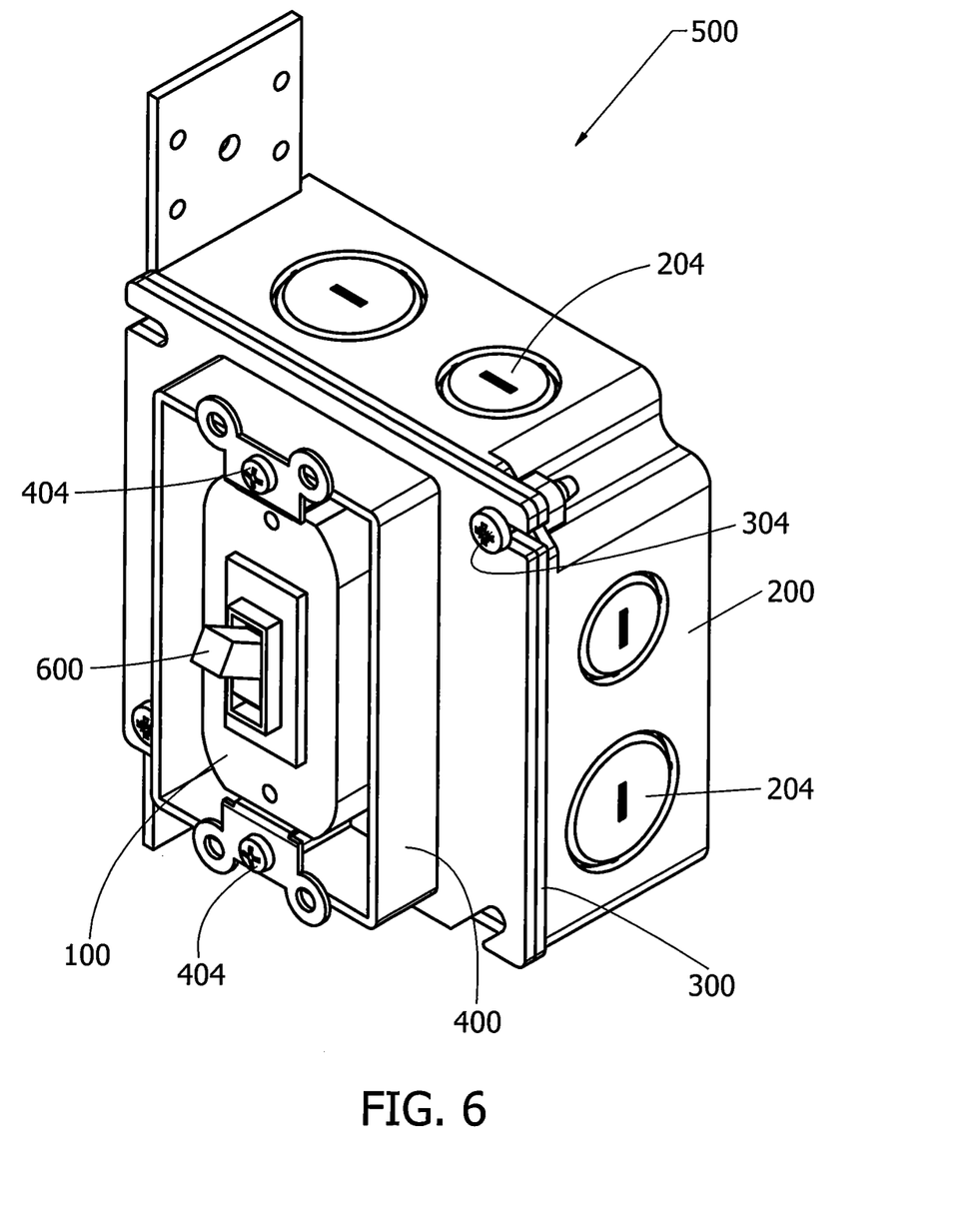
FIG. 6 illustrates a perspective view of the detachable outlet system including a switch in accordance with the disclosed architecture.

FIG. 6 illustrates the detachable outlet system 500, wherein the receptacle 100 comprises an electrical switch 600 instead of electrical outlets. As in FIG. 5, a male adapter (not shown) protrudes from the back face of the receptacle 100. Further, the gang box 200 comprises a female adapter (not shown) that is electrically wired and positioned internal to the gang box 200. The receptacle 100 is removably secured to the gang box 200 by mating the male adapter with the female adapter in electrical communication. Thus, allowing the receptacle 100 to be easily inserted into and removed from the gang box 200.

Furthermore, the detachable outlet system 500 can also include a protective plate 300 and a spacer plate 400. The protective plate 300 is secured to the gang box 200 via fastening devices 304, then a spacer plate 400 is secured to the protective plate 300 via fastening devices 304, or the protective plate 300 and spacer plate 400 are an integral single component which can then be secured to the gang box 200 via fastening devices 304. Receptacle 100 is then secured to the spacer plate 400 by fastening devices 404. Finally, a faceplate (not shown) can be placed over the receptacle 100 and secured. Additionally, knock-outs or removable access plugs 204 are provided on the sides of the gang box 200, as is known in the art.

Figure 7:
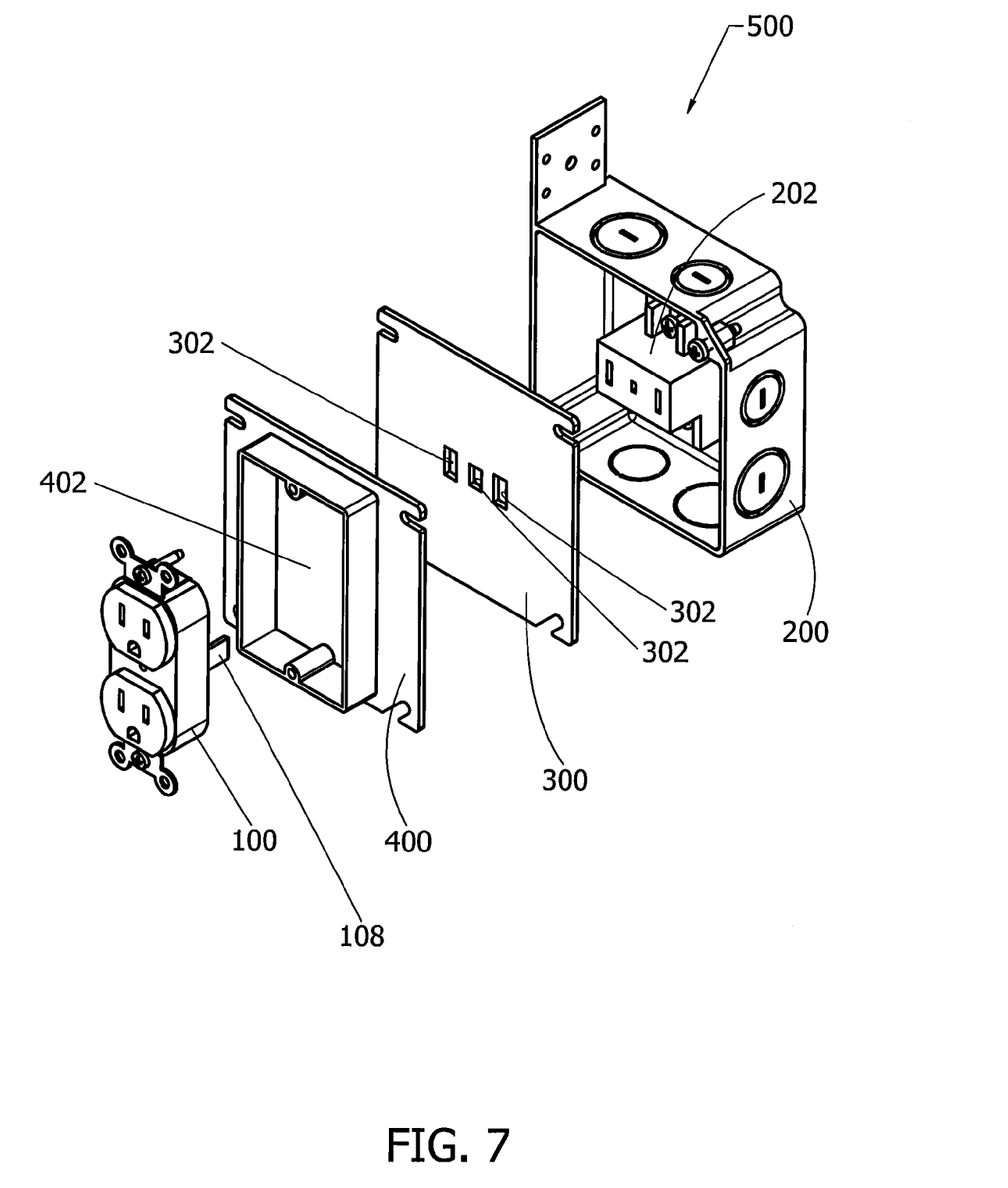
FIG. 7 illustrates an exploded view of the detachable outlet system in accordance with the disclosed architecture.

FIG. 7 illustrates an exploded view of the detachable outlet system 500, wherein a receptacle 100 is aligned to be secured with the spacer plate 400, which is then secured to the protective plate 300, and finally to the gang box 200. The prongs of the male adapter 108 of the receptacle 100 are inserted through the large opening 402 of the spacer plate 400 and then through prong openings 302 of the protective plate 300, and further mated in electrical communication into the openings of the female adapter 202 of the gang box 200 and secured.

In operation, a user aligns the prongs of the male adapter with the opening of the spacer plate, and the prong openings of the protective plate. The male adapter is then aligned with the female adapter of the gang box, and a user exhibits a pushing force to insert the receptacle into the gang box. Once the female and male adapters are matingly secured together in electrical communication, a faceplate can be positioned over the receptacle and secured into place via screws or any other suitable fastener as is known in the art without affecting the overall concept of the invention. If a user desires to switch or change the receptacle, the user unscrews the faceplate and pulls the receptacle from the gang box. If the receptacle remains secure, the user can pry it out with a screwdriver, knife, etc. Once the receptacle is removed, another receptacle with a male adapter positioned on its back face can be inserted into the gang box. Once the female and male adapters are secured in electrical communication, the faceplate is positioned back over the receptacle and secured.

Figure 8:
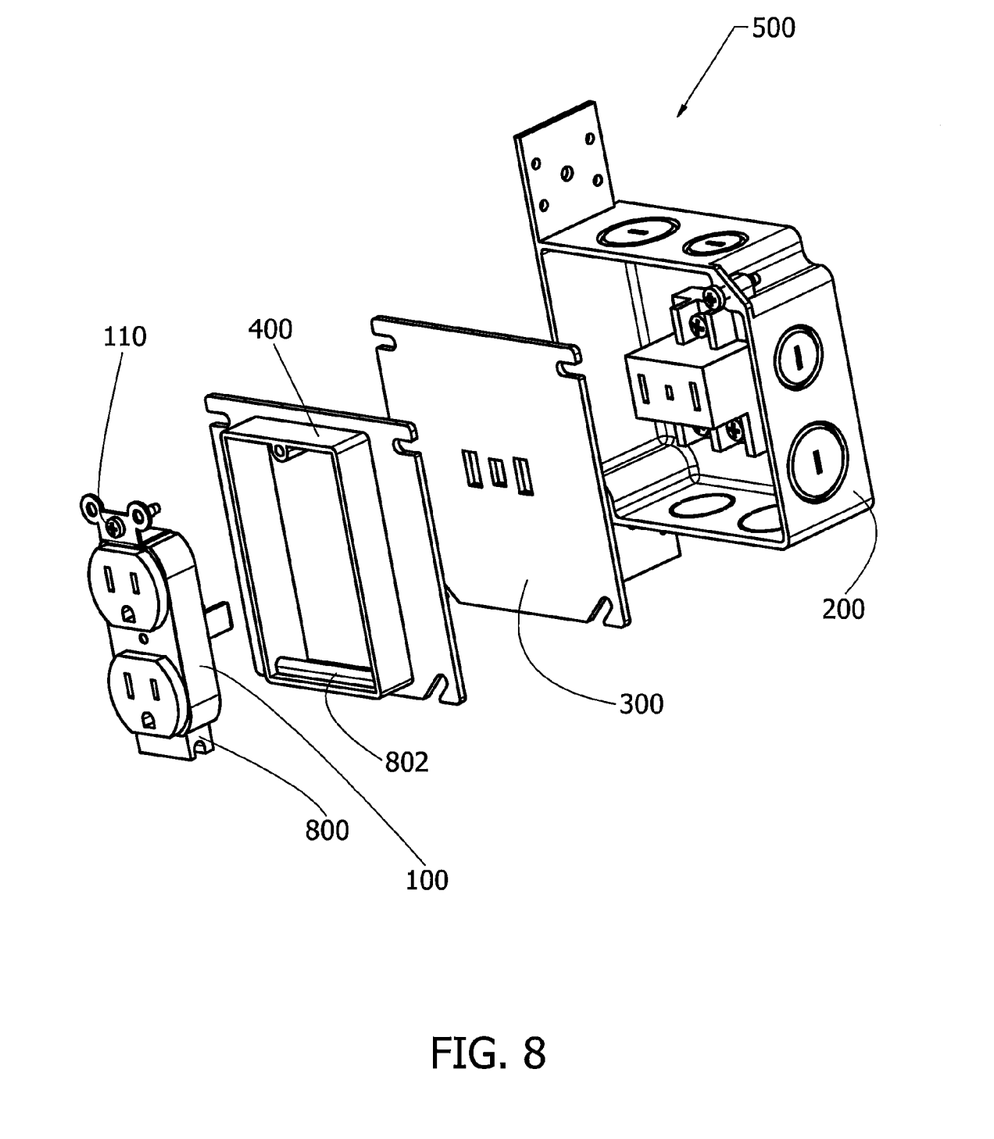
FIG. 8 illustrates an exploded view of another embodiment of the detachable outlet system in accordance with the disclosed architecture.

FIG. 8 illustrates another embodiment of the detachable outlet system 500. The receptacle 100 comprises a hook 800 positioned on the bottom of the receptacle 100. The hook 800 hooks into lip 802 on the bottom of the spacer plate 400, such that the receptacle 100 snaps in and is secured. Top screw 110 further acts to secure the receptacle 100, as well. The hook 800 can be located in any suitable position, such as the sides, bottom or top of the receptacle 100 without affecting the overall concept of the invention. The lip 802 can be located in any suitable position, such as the sides, bottom or top of the spacer plate 400 without affecting the overall concept of the invention. Furthermore, the lip 802 can also be attached to the gang box 200 or the protective plate 300, depending on whether the detachable outlet system utilizes a spacer plate 400 or a protective plate 300 with the gang box 200.

Furthermore, a second gang box can be secured to a first gang box. Typically, the first gang box and the second gang box comprise a contact strip positioned between the gang boxes to conduct voltage and current. The second gang box would be secured to the first gang box, with the contact strip sandwiched between the gang boxes. The first gang box would then be secured to a bracket, which would be electrically connected to conduct voltage and current through the gang boxes. Typically, the bracket is secured to a stud in the wall to support the gang boxes. Thus, the bracket is electrically connected to conduct voltage and current which passes through the contact strips and energizes the gang boxes. If a wire shorts-out and/or becomes non-functional, the corresponding gang box can be slid out to be repaired or replaced with a new gang box. Any suitable number of gang boxes can be secured together as is known in the art without affecting the overall concept of the invention.

Additionally, the male and female adapters can be switched such that the gang box would comprise the male adapter and the receptacle would comprise the female adapter. The gang box would still be wired to deliver electricity, but would comprise a male adapter instead of a female adapter. The receptacle would then comprise a female adapter secured to the back face. The receptacle would be removably secured to the gang box via mating in electrical communication the female adapter with the male adapter.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A detachable outlet system, comprising:
   at least one receptacle,
   wherein a male adapter is secured to the at least one receptacle; and
   at least one gang box adapted to comprise a female adapter, and
   a protective plate secured to the at least one gang box,
   wherein the female adapter is positioned internal to the at least one gang box, and
   wherein the at least one receptacle is removably secured to the at least one gang box via the male adapter inserted into the female adapter.

2. The outlet system of claim 1, further comprising a spacer plate secured to the at least one gang box.

3. The outlet system of claim 1, wherein the at least one receptacle is a single pole switch.

4. The outlet system of claim 1, wherein the at least one receptacle is a multiple pole switch.

5. The outlet system of claim 1, wherein the at least one gang box is sized to receive more than one receptacle.

6. A detachable outlet device, comprising:
   at least one receptacle; and
   a male adapter secured to the at least one receptacle; and
   wherein the at least one receptacle is secured to at least one gang box; and
   wherein the at least one gang box comprises a protective plate.

7. The detachable outlet device of claim 6, wherein the at least one gang box comprises a spacer plate secured to the protective plate.

8. The detachable outlet device of claim 6, wherein the at least one gang box is sized to receive more than one receptacle.

9. The detachable outlet device of claim 6, wherein the at least one receptacle is a single pole switch.

10. The detachable outlet device of claim 6, wherein the at least one gang box comprises electrical wires that are inserted in and secured to a female adapter.

11. The detachable outlet device of claim 10, wherein the female adapter is positioned internal to the at least one gang box.

12. The detachable outlet device of claim 11, wherein the at least one receptacle is removably secured to the at least one gang box by mating the male adapter with the female adapter in an electrical communication.

13. A detachable outlet system, comprising:
   at least one switch,
   wherein a male adapter is secured to the at least one switch; and
   at least one gang box removably secured to the at least one switch,
   wherein the at least one gang box comprises electrical wires that are inserted in and secured to a female adapter, and
   wherein the female adapter is positioned internal to the at least one gang box; and wherein the at least one gang box comprises a protective plate and a spacer plate secured to the protective plate.

14. The detachable outlet system of claim 13, wherein the at least one switch is removably secured to the at least one gang box by mating the male adapter with the female adapter in an electrical communication.

15. The detachable outlet system of claim 14, wherein the at least one gang box is sized to receive more than one switch.

\* \* \* \* \*